Patented May 9, 1939

2,157,530

UNITED STATES PATENT OFFICE 2,157,530

PROCESS FOR PRODUCING LOW SUBSTITUTED ALKYL CELLULOSES

Deane C. Ellsworth, deceased, late of Wilmington, Del., by Joseph F. Haskins, administrator, Wilmington, Del., and Frederick C. Hahn, Wilmington, Del., assignors to E. I. du Pont de Nemours & Company, Wilmington, Del., a corporation of Delaware No Drawing. Application July 22, 1933, Serial No. 681,760. Renewed March 16, 1939

22 Claims. (Cl. 260—231)

This invention relates to new cellulose derivatives and methods for making them. It relates more particularly to alkyl cellulose and especially those alkyl celluloses in which substantially less than two hydroxyl hydrogen atoms in every five glucose units of the cellulose are replaced by the alkyl residue and especially such compounds of this composition which are of limited solubility in caustic soda solution at room temperature and are relatively soluble in caustic soda solution at low temperatures.

Several modifications of alkyl cellulose are known in the prior art. These may be put into three groups:

(a) Ethers soluble in organic solvents.
(b) Ethers soluble in water.
(c) Ethers soluble in alkali.

These differ primarily in the amount of substitution that each represents, (a) being quite high, (b) much less and (c) still less in alkyl content. However, between each two classes there is a considerable zone wherein an ether of a given degree of substitution may be found in either class, depending upon the treatment the cellulose has received either before, during, or after the etherification, i. e., depending upon the degradation of the cellulose molecule. Thus the second important factor in determining solubility of alkyl cellulose and of cellulose compounds generally, in any given solvent—for example, 6% NaOH solution— is the state of degradation (depolymerization) of the cellulose ether. This second factor is even more important in affecting the usefulness of the cellulose derivative. It is to be understood, however, that these two factors are not absolute determinants as to solubility, but another factor, or other factors, which are not known may play a part. Derivatives in which the cellulose aggregates are broken down are always of poorer strength, and lower elasticity, than those that retain to a higher degree the state of polymerization of the native cellulose.

It is an object of this invention to prepare new alkyl derivatives of cellulose by reacting cellulose with an alkylating agent, which derivatives retain to a high degree the state of polymerization of the native cellulose. A further object is to so prepare these derivatives that they are readily dissolved in dilute caustic by the mechanism of the step of freezing or almost freezing the solution. A still further object is to prepare useful articles from these derivatives such as films, threads, molded articles, sized fabrics and the like and to improve the usefulness of some of these articles by applying to them a moisture-proof coating. Other objects will appear hereinafter.

Briefly, the process consists in treating cellulose with caustic alkali solution and subjecting the resulting alkali cellulose to direct contact with the etherifying agent, that is, the alkylating agent in such proportions and under such conditions that there results a new alkyl cellulose of low degree of substitution which retains a high degree of polymerization and which is insoluble or only imperfectly soluble in dilute aqueous solutions of alkalies at ordinary temperatures but soluble in such solutions at low temperatures. The new derivatives are, therefore, readily put into solution, through the mechanism of the step of freezing or almost freezing the solution during the preparation thereof, which solution may thereafter be put into the form of useful products and coagulated in that form.

In order to illustrate the new process the more fully the following examples are given.

Example 1

100 parts of wood pulp, containing not over 3% water, and of 86% alpha cellulose content are steeped in 2500 parts of 20% sodium hydroxide solution at a temperature of 25° C. for an hour. The alkali cellulose is pressed to 300 parts by weight, then shredded for 2 hours in a Werner-Pfleiderer type shredder until thoroughly torn to crumbs. The temperature of the shredding is kept below 25° C. by cold water circulating in the shredder jacket. The alkali cellulose is then aged in a loosely covered can for 25 hours at 25–27° C. This alkali cellulose is then placed in a mixing machine of the Warner-Pfleiderer type and an ethereal solution of dimethyl sulphate is added slowly so that no local overheating occurs. This solution is made up by dissolving 20 parts of dimethyl sulphate in 250 parts of ethyl ether. During the addition of the reagent, cold water is circulated through the shredder jacket. When the solution has all been added, the cover is fastened in place and the reaction is allowed to follow its course during eighteen hours, while kneading is maintained and the jacket water temperature is held at 27° C.

The white crumbly product is removed from the mixer, practically indistinguishable in appearance from the initial alkali cellulose. Analysis of the purified product showed a methoxyl content of 4.31%, equivalent to about 0.23 groups for each glucose unit of the cellulose. This reaction product is dispersed in 1700 parts of 6% sodium hydroxide solution to make a solution of 5% concentration based on the weight of the pulp used. Since it does not make a perfect solution at room temperature, it is necessary to cool by means of brine jacketed equipment or other refrigeration device until a temperature of —8 to —12° C. is reached. At this temperature the mass is very thick and pasty with crystals distributed throughout. It may become impossible to continue stirring the solution, in which case the mass quickly congeals. After a low temperature of —10° C. has been reached, it is not necessary to hold the mass at that temperature for any length of time; instead the solution is brought back to room temperature, with stirring renewed as soon as practicable. The solution will now be found to be smooth, essentially fiber-free, clear, colorless or a pale straw color, depending on the purity of the wood pulp used and the amount of bleaching it had received. It is now filtered through a filter press or centrifuged to remove any last fibers or extraneous matter to insure clear and perfect films. The solution, after freezing as described, is stable at room temperature for at least two weeks provided it is protected from the action of carbon dioxide of the air. It is placed under vacuum in order to remove entrapped air if it is to be used immediately for preparation of films or filaments but simply allowing the solution to stand will insure bubble-free products after a time.

For the preparation of transparent sheets the solution so prepared is spread out on a glass plate to a depth of about $\frac{3}{100}$ inch, and the glass plate immersed in a bath containing 10% sulphuric acid and 15% sodium sulphate. The film coagulates very rapidly and, after a few minutes, is removed from the plate, washed with water, dipped for about ½ minute in a 4% glycerine bath and spread again on the glass plate. It is now dried for 30 minutes at 60° C. After allowing the plate with the film on it to come back to room temperature and to humidify for about an hour it may be stripped from the plate. The sheet so secured is tough, flexible and elastic. It has a wet and dry strength about that of regenerated cellulose films and the dry film is softer and more flexible than films of regenerated cellulose.

*Example 2*

The films prepared as in Example 1 are coated with a composition comprising a synthetic resin and a wax, preferably with the addition of a plasticizer. This can be accomplished according to the teachings of the co-pending application Serial No. 461,840 filed June 17, 1930 by William H. Charch, by using for example:

| | Parts by weight |
|---|---|
| Polymerization products resulting from 60% vinyl chloride and 40% vinyl acetate | 15 |
| Tricresyl phosphate | 7 |
| Refined paraffin | 3 |

These components are dissolved in 100 to 200 parts of toluene and the film is coated in any suitable manner such as by immersion. After the excess coating has been removed the solvents are evaporated at an elevated temperature whereupon a film is produced having at least the same transparency and flexibility of the original base sheet but having in addition the ability to resist penetration of moisture or water vapors.

*Example 3*

The solution is made up as in Example 1. This solution is forced through a small orifice about .004 inch in diameter, into a coagulating bath consisting of 10% sulphuric acid and 15% sodium sulphate; the thread so formed, which may, if desired, be made up of combined filaments from several such orifices, is passed over guides in such a way that tension is applied to the thread while it is in the gelled state, and collected on a bobbin. It is subsequently washed free from acid, bleached, if desired, and dried.

*Example 4*

Textile materials, such as cotton cloth, are dipped into the solution prepared as in Example 1, then into a bath of 10% sulphuric acid. After a few minutes in this bath the cloth is removed, washed acid-free and dried.

*Example 5*

81 parts oven-dried cellulose in sheet form are steeped in 20% sodium hydroxide solution at room temperature for one hour and then pressed to a weight of 243 parts. The sheets are comminuted in a shredder during 2 to 3 hours until uniform fine crumbs are obtained. The alkali cellulose so obtained is allowed to ripen for 20 hours at 30° C., then put back into the shredder, with cold water circulating through the cooling jacket surrounding the shredding chamber, while a solution of 38 parts of dimethyl sulphate in 200 parts of diethyl ether is added slowly so that the heat of reaction will at no time cause local overheating. The reaction is then allowed to take place at 30° C. for 20 hours. The product is not visually distinguishable from the alkali cellulose used.

This product is dispersed, without isolation, in enough 6% sodium hydroxide to make a 5% solution, calculated on the basis of the original cellulose. The mixture is then cooled to —5 to —10° C. The clarity becomes, at once, much enhanced and the solution can be readily filtered, either cold or after raising to room temperature, leaving practically no residue. The filtered solution is clear, faintly straw colored and stable at 30–35° C. for 2½ weeks or more. This solution can be made into sheets or threads as in Example 2 or 3 and is especially suitable for impregnating cloth or sizing paper.

Instead of dissolving the reaction product immediately, it may be plunged into water containing enough acid to neutralize the caustic or into enough water to dilute the caustic below 1% strength. The precipitate is then washed free from salts or alkali and dried at 65–100° C. The product is a white, fibrous material, completely soluble in 5 to 10% sodium hydroxide at or below 0° C. Analysis of this product by the Zeisel method showed a methoxyl content of 7.98% equivalent to 0.43 methyl groups for each glucose unit of the cellulose.

*Example 6*

240 parts of alkali cellulose prepared as in Example 5 are allowed to age for 24 hours at 25° C., then put into a mixing machine with 60–70 parts of diethyl sulphate and the mixture is thoroughly kneaded during a reaction time of 24 hours. The temperature is maintained at 35–40° C. by circulating water at this temperature in the jacket of the mixture. The white product, which has the appearance of unchanged alkali cellulose, is put to disperse in 1300 grams of 6% caustic in which it does not dissolve at room temperature, or dissolves only partially, to make a mushy, fibrous slurry of swollen fibers. This is cooled to the freezing point (−12° C.) or just above it to form an excellent, viscous but clear and transparent solution suitable for use in forming films, threads, etc.

*Example 7*

One mol (162 grams) of oven-dry wood cellulose is steeped in 19% sodium hydroxide solution at room temperature for an hour, pressed to a weight of 486 grams and shredded for 2 hours in the standard manner. This alkali cellulose is allowed to age at room temperature (25° C.) for 24 hours, and then placed in an autoclave provided with a stirrer and external heating device. Methyl chloride is forced in until ¼ mol (12.5 grams) are introduced. The autoclave is sealed off and heated, with stirring, to a temperature of 85–90° C., at which temperature it is held for 3½ hours. After cooling, the product is removed and dispersed in 2400 cc. of 6% sodium hydroxide solution. At room temperature there results a partial solution containing incompletely soluble fibers. After freezing (−12° C.), the solution filters very well, and is suitable for the preparation of films or filaments as described in Examples 1 and 3 or for sizing paper or treating textiles.

As starting materials for the preparation of such low substituted alkyl celluloses we may use cellulose in the form of cotton linters, or wood pulp, in which the state of molecular aggregation is high as evidenced by high or medium viscosities and high alpha cellulose content, i. e., more than 15 seconds viscosity in the standard cuprammonium test and more than 85% alpha cellulose content. The cellulose is preferably dry but need not be bone dry. Air dried cellulose would ordinarily be used.

It has been found that in order to obtain these new derivatives of suitable solubility in dilute alkali solution it is essential to coordinate two factors, namely, the degree of degradation of the cellulose and the degree of substitution of alkyl residue. To obtain solubility suitable to permit desirable concentration and viscosity in the spinning solution, for example, a slight degradation of the cellulose during the preparation of the alkali cellulose is desirable but the treatment in this operation should not be unnecessarily drastic. In some cases the degradation effected by the alkali cellulose process may be so slight as to leave the cellulose in a substantially undegraded condition. In general, however, this process should effect a slight degradation of the cellulose but, where high strength and elasticity of the product are desired, this is not to be allowed to proceed beyond the degree of degradation which occurs when the alkali cellulose is prepared from purified cotton linters and aged for 48 hours at 25° C. For many purposes the degree of degradation should not exceed that which occurs when the alkali cellulose is prepared from purified cotton linters and aged for 48 hours at 20° C. In the preferred form of the invention the cellulose is steeped for not more than one hour in an 18–20% solution of caustic alkali at room temperature, or below, and the excess solution is pressed out to leave a moist alkali cellulose which is then shredded to a state of fine crumbs, known to the viscose industry. The concentration of alkali in the steeping caustic may be, however, varied within rather wide limits above 18% though not with much success below this figure unless the steeping temperature is very much below room temperature. Shredding should be carried out at not more than 25° C. and for as short a time as feasible.

The degree of degradation indicated in the above standard is the maximum permissible for a product of high quality and it is to be understood that even more desirable products, i. e., products of increased strength and water resistance are made from alkali cellulose of a lower degree of degradation obtainable by operating at lower temperatures or by aging for shorter periods.

Aging of the alkali cellulose should be for as short a time as possible (consistent with the quality of the product desired). The amount of aging required varies with the nature of the cellulose used, with the amount of etherifying agent to be used and with the purpose for which the solution of the derivative is intended. This aging of the alkali cellulose may sometimes be eliminated but in case of a very resistant cellulose, or in cases where an alkyl cellulose solution of high concentration and moderate viscosity is desired, more or less aging is unavoidable. In general, in order to produce useful alkyl celluloses which will dissolve in dilute alkalies only on cooling to 0° C., or lower, and which are suitable for the production of film and filaments of high quality, the alkali cellulose aging should not exceed 24 hours at 28° C. or 48 hours at 20° C. For most purposes a shorter period is preferable.

In the etherification reaction, further degradation of the cellulose is controlled by operating under non-oxidizing conditions and by limiting the reaction temperature to not above 50° C. and preferably to around 40–42° C. The degree of substitution is controlled by limiting the proportion of the etherification agent used to a range of from ⅛ mole to 1 mole per $C_6$ unit of cellulose and by terminating the reaction promptly when the desired degree of substitution has been effected. The etherification reagent may be any one of the lower alkylating agents, i. e., a methylating or an ethylating agent, preferably dimethyl sulphate. It may be added either dry or in the form of a one normal solution or any other desirable variation. To insure that the desired end point is not past, an end point test has been devised and is described later in this specification. As stated above the amount to be added depends on the product desired and the treatment to which the cellulose has already been subjected, and further it depends upon the nature of the reagent, thus dimethyl sulphate is more reactive than diethyl sulphate or methyl chloride. In balancing the two controlling factors within the limits of this invention it has been found to be preferable to secure the necessary solubility by a slightly greater degree of substitution while keeping the degradation of the cellulose at a minimum, since this method leads to products which give films, threads, etc., of higher strength and elasticity. The proper stage of etherification at which to terminate the reaction may be determined by removing samples of the reaction mixture from time to time, and placing them in dilute caustic and cooling to freezing. If a few drops of the solution, warmed again to room temperature, are then placed between glass plates and the plates pressed or rubbed against each other, a good product will remain clear, while insoluble fibers will be easily seen in an incompletely reacted product. While, as stated above, it is inadvisable to go above 50° C. the temperature of the reaction may be varied somewhat provided the reaction is stopped when this stage of cold alkali solubility is reached, as shown by the solubility test. It will be understood that wherever, throughout the specification and claims, the expression "reacting" is used, reacting to the point where the above test is positive is meant. In all the steps of the process care is taken to avoid depolymerization by using low temperature, cold water or brine circulating in the shredder during the shredding step, exclusion of air wherever practicable, etc.

In the preparation of certain of the useful articles mentioned above the etherification product containing approximately 0.23 to 0.60 alkyl residues per glucose unit is mixed with about 16 times its weight of a 6–10% sodium hydroxide solution and cooled below 0° C. or to the solubility point. In many cases lower concentrations of caustic, e. g., 4%, may be used with advantage, especially where the solution is to be used for purposes other than spinning, for example, for sizing, impregnating, etc.

When it is desirable to isolate the alkyl cellulose, the product obtained by the etherification may be washed out with a large excess of water, keeping the sodium hydroxide content of the washing below 1%, and then dried, but such products have a tendency to dry to a horny condition difficult to dissolve. This difficulty may be overcome to some extent by washing with methanol and then with ether before drying. But it is, in general, unnecessary to isolate this product, since for spinning it is preferable to dissolve the etherification product directly in dilute alkali, adjusting the concentration to the desired viscosity.

In preparing the solutions, temperatures from 5° C. down to the freezing point are satisfactory. The temperature to which the mixture must be cooled to effect solution is to some extent dependent on the degree of substitution of the derivative. The lower the degree of substitution the lower the temperature required to effect complete dispersion. The solution so obtained may be brought back to room temperature and filtered if desired. It may be used directly for treatment of textiles or paper, or it may be put into the desired form and coagulated by a suitable bath. While the solutions that we have described are not indefinitely stable at room temperatures they may be kept for as long as three weeks without jelling. High temperatures accelerate the jelling, but after jelling has taken place the material may be rendered fluid again by chilling. The re-chilled solution is, however, not stable for as long a time at room temperature as the original solution. It may be that the stability of these solutions at room temperature or above is a phenomenon of hysteresis.

In the process used to form fibers or threads, considerable variation is possible in the composition of the coagulating bath. Water may in some cases be used, but is usually not satisfactory. Solutions of mineral acids such as sulfuric, ranging from low concentrations, such as 3–4%, to 70% or higher are suitable. These may with benefit be combined with salt solutions, as 5–15% $Na_2SO_4$ or $(NH_4)_2SO_4$, and also with buffers and sugars such as is common practice in the viscose industry. The problem of coagulation is thus very similar to that of viscose, but is not complicated by the necessity for regeneration and there is contamination only with the salt and water of the solution. Absence of sulfur compounds also diminishes the need for bleaching.

In the preparation of transparent sheets by the process of this invention the sheets may be softened by such softeners as glycerol, diethylene glycol and the like. The amount of softener required is somewhat less than that required for regenerated cellulose films and the unsoftened film is more flexible than an unsoftened regenerated cellulose film.

The process described in Example 1 for preparing transparent sheets is one suited to laboratory technique. Instead of coagulating the film on a glass plate, the solution may be forced continuously through a narrow slit into a coagulation bath and thereafter passed over rolls, through suitable baths, etc., in the manner known to the industry. In this case and more particularly in Example 3, which concerns the formation of threads and is not adapted to laboratory technique, continuous mechanical processes have not been described since the invention is not concerned with these and since they are well known to the art.

It has also been found that the transparent sheets mentioned above may be rendered moistureproof. In addition to the method described in Example 2 they may be treated according to the process described in Charch and Prindle U. S. Patent 1,737,187 for the moistureproofing of sheets of regenerated cellulose. A satisfactory composition for this purpose contains 43 parts cellulose nitrate, 23 parts tricresyl phosphate, 7 parts paraffin wax, 27 parts gum damar, and 760 parts of a mixed solvent containing about 3 parts ethyl acetate to 2 parts toluene. After passing sheets of alkyl cellulose made as in Example 1 through the above composition the excess lacquer was removed from the sheets by means of a squeeze roll and the sheets were dried at a temperature substantially above the melting point of the wax.

The moistureproofed sheets were glass clear, flexible, and were highly impermeable to the passage of moisture vapor, comparing very favorably in this respect with films of regenerated cellulose which had been moistureproofed by the same composition. However, when the adhesion of the moistureproofed coating was tested by suspension in water, it was found to be distinctly superior to the adhesion of a similar coating on a sheet of regenerated cellulose.

Still another method of treatment comprising using the composition given below which is disclosed in a copending application, Serial No. 582,488 filed Dec. 21, 1931 by William R. Straughn:

| | Parts |
|---|---|
| Candelilla wax | 33 |
| Paraffin (melting point 62° C.) | 16 |
| Zinc resinate | 5 |
| Toluene | 500 to 1000 |

The solution is applied in any convenient manner, the excess removed and the solvent evaporated at an elevated temperature. The resulting coated film is glass clear in transparency, flexible and distinctly moistureproof.

These new low substituted products differ from those of the prior art in that the degree of substitution is limited to the range of from 0.23 to 0.60 alkyl residue per unt of cellulose. They are distinguished further in that they are insoluble, or at least imperfectly soluble in dilute aqueous caustic alkali at normal temperatures but become soluble in such alkali solution when the solution is chilled to near its freezing point.

These new derivatives are superior to the previously described alkyl celluloses soluble in dilute alkalies at room temperatures in that they are less hygroscopic and less sensitive to water in general. Transparent sheets made from them have a higher wet strength and may, therefore, be handled more easily during manufacture and are less susceptible to damage in such processes as the finished goods must undergo. These films are superior to regenerated cellulose in having a greater flexibility and softness, and moreover they have a marked affinity both for basic and for direct dyestuffs.

Other advantages have been stated or are apparent in the specifications and examples.

It is obvious that many apparent and widely different embodiments of this invention may be made without departing from the spirit thereof and the invention is not intended to be limited except as indicated in the appended claims.

We claim:

1. The process of preparing low substituted alkyl cellulose soluble in dilute sodium hydroxide solution at about the freezing point but not practically soluble at ordinary temperatures which comprises reacting substantially undegraded alkali cellulose with an alkylating agent, the alkyl group of which contains from one to two carbon atoms under non-oxidizing conditions, at etherifying temperature, not above about 50° C.

2. A process of preparing low substituted alkyl cellulose soluble in dilute sodium hydroxide solution at about the freezing point but not practically soluble at ordinary temperatures which comprises reacting alkali cellulose within the range from substantially undegraded cellulose to cellulose degraded but not beyond the stage obtained by aging alkali cellulose for 48 hours at 25° C., with an alkylating agent, the alkyl group of which contains from one to two carbon atoms under non-oxidizing conditions, at etherifying temperature, not above about 50° C.

3. A process of preparing low substituted alkyl cellulose soluble in 6% aqueous sodium hydroxide solution at about the freezing point thereof but not practically soluble therein at ordinary temperatures, which comprises treating alkali cellulose, degraded but not beyond the stage obtained by aging alkali cellulose for 48 hours at 25° C., with an alkylating agent, the alkyl group of which contains from one to two carbon atoms, under non-oxidizing conditions, until up to 0.60 alkyl residues per $C_6$ unit of cellulose have been introduced, and thereupon stopping the etherification.

4. The process of preparing low substituted alkyl cellulose soluble in 6% sodium hydroxide at about the freezing point thereof but not practically soluble therein at ordinary temperatures, which comprises reacting alkali cellulose, degraded but not beyond the stage obtained by aging alkali cellulose for 48 hours at 25° C., with an alkylating agent, the alkyl group of which contains from one to two carbon atoms under non-oxidizing conditions at etherifying temperature not above 50° C.

5. The process of preparing low substituted methyl cellulose soluble in 6% sodium hydroxide at about the freezing point thereof but not practically soluble therein at ordinary temperatures, which comprises reacting alkali cellulose, degraded but not beyond the stage obtained by aging alkali cellulose for 48 hours at 25° C., with a methylating agent under non-oxidizing conditions at etherifying temperature not above 50° C.

6. The process of preparing low substituted alkyl cellulose soluble in 6% sodium hydroxide at about the freezing point thereof but not practically soluble therein at ordinary temperatures, which comprises reacting alkali cellulose, degraded but not beyond the stage obtained by aging alkali cellulose for 48 hours at 25° C., with an ethylating agent under non-oxidizing conditions at etherifying temperature not above 50° C.

7. The process of preparing low substituted methyl cellulose soluble in 6% sodium hydroxide at about the freezing point thereof but not practically soluble therein at ordinary temperatures, which comprises reacting alkali cellulose, degraded but not beyond the stage obtained by aging alkali cellulose for 48 hours at 25° C., with dimethyl sulfate under non-oxidizing conditions at etherifying temperature not above 50° C.

8. A low substituted ethyl cellulose substantially insoluble in 6% aqueous caustic soda at ordinary temperature but soluble in said caustic soda solution near the freezing point thereof.

9. A process of preparing stable alkali solutions of low substituted alkyl cellulose which comprises agitating a low substituted alkyl cellulose, the alkyl residues being present in an amount not exceeding 0.60 lower alkyl residues per $C_6$ unit of cellulose, the alkyl group of which contains from one to two carbon atoms, said alkyl cellulose being substantially insoluble in 6% aqueous caustic soda at ordinary temperature but soluble in said alkali solution near the freezing point thereof, with dilute aqueous caustic soda solution, chilling below 0° C. and agitating until solution is effected.

10. A process of preparing stable alkali solutions of low substituted alkyl cellulose which comprises agitating a low substituted methyl cellulose substantially insoluble in 6% aqueous caustic soda at ordinary temperature but soluble in said caustic soda solution near the freezing point thereof, the methyl residues being present in an amount not exceeding 0.35 methyl residues per $C_6$ unit of cellulose, with dilute aqueous caustic soda solution, chilling below 0° C. and agitating until solution is effected.

11. A process of preparing stable alkali solutions of low substituted alkyl cellulose which comprises agitating the product of claim 8 with dilute aqueous caustic soda solution, chilling below 0° C. and agitating until solution is effected.

12. As a new product alkyl cellulose, containing from 0.23 to 0.35 lower alkyl residues per $C_6$ unit of cellulose, said alkyl residues containing one to two carbon atoms, said product being substantially insoluble in 6% aqueous caustic alkali at room temperature but soluble in said alkali solution near the freezing point thereof.

13. The process of preparing solutions of the product described in claim 12 which comprises mixing the said product with an aqueous solution of an alkali metal hydroxide, chilling below 0° C. and agitating until a clear solution is effected.

14. The process of preparing solutions of the product described in claim 12 which comprises mixing the said product with an aqueous solution of an alkali metal hydroxide, chilling below −5° C. and agitating until a clear solution is effected.

15. The process of preparing solutions of the product described in claim 12 which comprises mixing the said product with an aqueous solution of an alkali metal hydroxide, chilling to and agitating at the freezing point of the alkaline solution until a clear solution is effected.

16. An aqueous alkali metal hydroxide solution of alkyl cellulose soluble in dilute sodium hydroxide solution at about the freezing point but not practically soluble at ordinary temperatures containing from 0.23 to 0.60 lower alkyl residues per $C_6$ unit of cellulose.

17. A process for preparing low substituted lower alkyl cellulose soluble in 6% sodium hydroxide at the freezing point thereof but not practically soluble therein at ordinary temperatures, which comprises reacting alkali cellulose with an alkylating agent, the alkyl group of which contains from one to two carbon atoms, continuing the reaction until the product, while not practically soluble in 6% caustic soda solution at ordinary temperature, dissolves in said caustic soda solution cooled to the freezing point thereof, to form a solution stable at ordinary temperature, and thereupon discontinuing the reaction.

18. A process for preparing low substituted methyl cellulose soluble in 6% sodium hydroxide at the freezing point thereof but not practically soluble therein at ordinary temperatures, but which comprises reacting alkali cellulose with a methylating agent, continuing the reaction until the product, while not practically soluble in 6% caustic soda solution at ordinary temperature, dissolves in said caustic alkali solution cooled to the freezing point thereof, to form a solution stable at ordinary temperature, and thereupon discontinuing the reaction.

19. A process for preparing low substituted methyl cellulose soluble in 6% sodium hydroxide at the freezing point thereof but not practically soluble therein at ordinary temperatures, which comprises reacting alkali cellulose with dimethyl sulfate, continuing the reaction until the product, while not practically soluble in 6% caustic soda solution at ordinary temperature, dissolves in said caustic soda solution cooled to the freezing point thereof, to form a solution stable at ordinary temperature, and thereupon discontinuing the reaction.

20. A process for preparing low substituted ethyl cellulose soluble in 6% sodium hydroxide at the freezing point thereof but not practically soluble therein at ordinary temperatures, which comprises reacting alkali cellulose with an ethylating agent, continuing the reaction until the product, while not practically soluble in 6% caustic soda solution at ordinary temperature, dissolves in said caustic soda solution cooled to the freezing point thereof, to form a solution stable at ordinary temperature, and thereupon discontinuing the reaction.

21. A low substituted alkyl cellulose, the alkyl group of which contains from one to two carbon atoms, said alkyl cellulose being substantially insoluble in 6% aqueous caustic soda at ordinary temperature but soluble in said alkali solution near the freezing point thereof.

22. A low substituted methyl cellulose substantially insoluble in 6% aqueous caustic soda at ordinary temperature but soluble in said caustic soda solution near the freezing point thereof.

JOSEPH F. HASKINS,
*Administrator of Deane C. Ellsworth, Deceased.*
FREDERICK C. HAHN.